US010843938B2

(12) United States Patent
Mahdjoubi Namin

(10) Patent No.: US 10,843,938 B2
(45) Date of Patent: *Nov. 24, 2020

(54) DEVICE AND METHOD FOR PURIFYING AND RECYCLING SHOWER WATER

(71) Applicant: ORBITAL SYSTEMS AB, Malmö (SE)

(72) Inventor: Amir Mehrdad Mahdjoubi Namin, Malmö (SE)

(73) Assignee: ORBITAL SYSTEMS AB, Malmo (SE)

( * ) Notice: Subject to any disclaimer, the term of this patent is extended or adjusted under 35 U.S.C. 154(b) by 129 days.

This patent is subject to a terminal disclaimer.

(21) Appl. No.: 15/921,524

(22) Filed: Mar. 14, 2018

(65) Prior Publication Data
US 2018/0201516 A1   Jul. 19, 2018

Related U.S. Application Data

(63) Continuation-in-part of application No. 14/367,772, filed as application No. PCT/SE2012/051430 on Dec. 19, 2012, now Pat. No. 9,956,512.

(30) Foreign Application Priority Data

Dec. 23, 2011 (SE) ...................... 1151272

(51) Int. Cl.
C02F 1/00 (2006.01)
C02F 1/32 (2006.01)
(Continued)

(52) U.S. Cl.
CPC .............. *C02F 1/008* (2013.01); *C02F 1/003* (2013.01); *C02F 1/442* (2013.01); *E03B 1/042* (2013.01);
(Continued)

(58) Field of Classification Search
CPC .. C02F 1/003; C02F 1/008; C02F 1/32; C02F 1/442; C02F 2103/002; C02F 2201/326;
(Continued)

(56) References Cited

U.S. PATENT DOCUMENTS 5,234,583 A    8/1993  Cluff
5,293,654 A *  3/1994  Castwall ................... E03C 1/00
                                                              4/597

(Continued)

FOREIGN PATENT DOCUMENTS

JP      0819773 A       1/1996
JP      2007325983 A    12/2007
(Continued)

OTHER PUBLICATIONS

Perry et al. ed., "Perry's Chemical Engineers' Handbook" 7th ed., 1997, p. 8-4. (Year: 1997).*

(Continued)

*Primary Examiner* — Lucas A Stelling
(74) *Attorney, Agent, or Firm* — Moser Taboada

(57) ABSTRACT

The present invention describes a hybrid device allowing for purification and either recycling of water or discarding of water, wherein said hybrid device comprises a recirculation loop which facilitates recirculation of water within said hybrid device, and also comprises:

a filter system comprising at least one filter;
at least one water quality sensor,
a modified drain, which is adapted to collect the water used and to facilitate the stream of water used towards the recycling loop and filter system, so that water can be purified and recirculated, or towards drainage;
a water treatment unit arranged for hygenisation of water;
a functionality sensor for the water treatment unit;
wherein the hybrid device is arranged so that:
(Continued)

it can operate in a recirculation mode providing purification and recirculation of water, until the water passing through said hybrid device is at a maximum level of contaminants;

when any of said sensors is indicating the need to do so, and in particular when said at least one water quality sensor indicates that the water is contaminated above said maximum level of contaminants, the same water is redirected from recirculation to drainage and is discarded from the hybrid device.

14 Claims, 3 Drawing Sheets

(51) Int. Cl.
| | | |
|---|---|---|
| *C02F 1/44* | (2006.01) | |
| *E03B 1/04* | (2006.01) | |
| *E03B 7/07* | (2006.01) | |
| *E03C 1/00* | (2006.01) | |
| *E03C 1/04* | (2006.01) | |
| *C02F 103/00* | (2006.01) | |

(52) U.S. Cl.
CPC .............. *E03B 7/074* (2013.01); *E03C 1/00* (2013.01); *E03C 1/0408* (2013.01); *C02F 1/32* (2013.01); *C02F 2103/002* (2013.01); *C02F 2201/326* (2013.01); *C02F 2209/001* (2013.01); *C02F 2209/03* (2013.01); *C02F 2209/05* (2013.01); *C02F 2209/11* (2013.01); *C02F 2209/40* (2013.01); *C02F 2209/42* (2013.01); *C02F 2301/046* (2013.01); *C02F 2307/06* (2013.01); *E03B 2001/045* (2013.01); *Y02A 20/148* (2018.01); *Y02A 20/30* (2018.01)

(58) Field of Classification Search
CPC ............ C02F 2301/046; C02F 2307/06; E03B 1/042; E03B 7/074; E03B 2001/045; E03C 1/00; E03C 1/0408; Y02A 20/148; Y02A 20/304

See application file for complete search history.

(56) References Cited

U.S. PATENT DOCUMENTS

| | | | |
|---|---|---|---|
| 5,353,448 | A | 10/1994 | Lee |
| 7,390,343 | B2 | 6/2008 | Tepper |
| 2003/0062300 | A1 | 4/2003 | Okano et al. |
| 2003/0189002 | A1* | 10/2003 | Proulx ............... E03B 1/042 |
| | | | 210/284 |
| 2006/0006114 | A1* | 1/2006 | Deskins ............... C02F 1/004 |
| | | | 210/724 |
| 2009/0084734 | A1* | 4/2009 | Yencho ............... C02F 1/325 |
| | | | 210/741 |
| 2010/0237021 | A1 | 9/2010 | Guttau et al. |
| 2011/0036760 | A1 | 2/2011 | Retolaza et al. |
| 2011/0146800 | A1* | 6/2011 | Jallon ............... C02F 9/005 |
| | | | 137/1 |
| 2011/0225722 | A1 | 9/2011 | Valdenaire |

FOREIGN PATENT DOCUMENTS

| | | |
|---|---|---|
| SE | 469413 B | 7/1993 |
| WO | WO-2004101902 A1 | 11/2004 |

OTHER PUBLICATIONS

Supplementary European Search Report dated Jul. 24, 2015 for Application No. 12860968.

Japanese Office Action dated Aug. 23, 2016 for Application No. 2014-548736.

* cited by examiner

DEVICE AND METHOD FOR PURIFYING AND RECYCLING SHOWER WATER

CROSS-REFERENCE TO RELATED APPLICATIONS

This application is a continuation-in-part of U.S. patent application Ser. No. 14/367,772, filed on Jun. 20, 2014, which is the National Phase of International Application No. PCT/SE2012/051430, filed on Dec. 19, 2012, which claims priority to Sweden Patent Application No. 1151272-0, filed on Dec. 23, 2011, and the disclosures of each of the above is incorporated herein by reference in its entirety.

FIELD OF THE INVENTION

The present invention relates to a shower concept that involves optional and optimized recirculation of water combined with verified purification, thereby providing an economically and environmentally competitive alternative.

BACKGROUND

It is known to both recycle and filter water in shower systems. For example, in US2011225722 there is disclosed a device for distribution of shower water in a closed circuit. The device includes an element for closing the outlet for draining the shower pan and an intake element including an intake pump able to draw in water from the shower pan, filter it and feed it back, via the water redistribution element to the element suitable for spraying the water. Further, SE469413 describes a shower comprising at least one nozzle through which a fluid flows in a shower cabin. The shower shows a collection container for said fluid, and a nozzle and said container are part of a circulation circuit comprising a pump, aiding said fluid in said container to circulate through said nozzle. The shower also shows means to discard said fluid. In US 20110146800 a water recycling apparatus and fluid contamination detection system is disclosed. This system comprises optical means for detecting contaminants, a filter for purification and may also include a disinfection unit. Furthermore, in US20100237021 a recirculation shower for aircrafts or other transportations is disclosed. This device comprises backwash lines. A first backwash line, designed to convey backwash water to the filtration unit and a second backwash line designed to discharge backwash water from the filtration unit. The purpose of the arrangement is to minimize the use of freshwater.

There are several drawbacks to the methods and devices described in these documents. Firstly, there is no means for providing a user with a shower experience equal to that of a conventional shower. Furthermore, the shower described in SE469413 place a heavy burden of control and maintenance on the user and is not very user-friendly. The cabin in US2011225722 does not provide user-important options. In both US2011225722 and SE469413 there is no way of knowing if the device or system is operating in a satisfactory way. This leaves an unsolved issue of hygiene. Moreover, in US2011225722 the water is passed through a filtering means, preferably a grid filter or sieve. This leads to a potential problem with bacterial growth and recirculation of contaminated water as a result. Further-more, SE469413 and US20110146800 disclose a water container under the drain in the shower cabin where the water that is to be recirculated is contained. The contained contaminated water implies the potential risk of bacterial growth and viral spreading along with odour and risk for place of residence for various pests.

Neither the backwash function, disclosed in US20100237021, discloses any means for verifying the quality of the filter post backwashing. This also, as previously mentioned, indicates potential problems with bacterial growth and viral spreading along with odour and risk for place of residence for various pests. Furthermore, both US20110146800 and US20100237021 disclose an optional use of disinfectants. The use of substances with disinfecting qualities in these systems, indicate an increased risk for hypersensitivity and various allergies. Further, several of the known arrangements use optical detection with potential problems with bubbles during the detection. When the water is flowing in the system turbulence is known to occur which produce bubbles that make optical measurements more difficult. Yet another drawback is experienced when any of the previous inventions malfunctions. It can for example be malfunctions regarding the filter components or the pump system. The user is then left with no shower options.

One aim of the present invention is to provide a shower solution ensuring that the user receives an equally comfortable and non-complicated shower experience as in a conventional shower. Another aim of the present invention is to ensure the quality of said shower experience. Yet another aim of the present invention is to provide an economically and environmentally friendly option to existing shower alternatives.

SUMMARY

The purpose above is achieved by a hybrid device allowing for purification and either recycling of water or discarding of water, wherein said hybrid device comprises a recirculation loop which facilitates recirculation of water within said hybrid device, and also comprises:
  a filter system comprising a at least one filter;
  at least one water quality sensor,
  a modified drain, which is adapted to collect the water used and to facilitate the stream of water used towards the recycling loop and filter system, so that water can be purified and recirculated, or towards drainage;
  a water treatment unit arranged for hygenisation of water;
  a functionality sensor for the water treatment unit;
  wherein the hybrid device is arranged so that:
  it can operate in a recirculation mode providing purification and recirculation of water, until the water passing through said hybrid device is at a maximum level of contaminants;
  when any of said sensors is indicating the need to do so, and in particular when said at least one water quality sensor indicates that the water is contaminated above said maximum level of contaminants, the same water is redirected from recirculation to drainage and is discarded from the hybrid device.

The filter system incorporated in the hybrid device according to the present invention may comprise one or several filters. The filters may be of different type, as notable from below. According to one specific embodiment of the present invention, the filter system comprises a depth filter (mechanical filter).

According to a further embodiment, the present invention is directed to a hybrid device allowing purification and either recycling of water or discarding of water, wherein said hybrid device comprises a recirculation loop, a filter system with a nano-filter, at least one filter quality sensor and at least one pre-filter positioned before the nano-filter in process terms, and wherein the hybrid device is arranged to redirect the water from recirculation to drainage when the at least one filter quality sensor indicates the need thereof. Moreover, the pre-filter may be positioned in the modified drain unit. Furthermore, the pre-filter unit may be a rough filter intended to separate off hair and larger contaminants in the water flow. Moreover, according to one specific embodiment the filter system comprises a rough filter as a pre-filter unit and also a main filter in the form of a depth filter/mechanical filter, which is further discussed below. According to yet another specific embodiment of the present invention the filter system comprises a pre-filter being a rough filter unit which is positioned in the modified drain.

Said hybrid device according to the present invention enables users to receive an equally comfortable shower experience as in a conventional shower. The present invention allows both wash and rinse actions, implying that the water may be purified and recirculated until the water passing the system is at a pre-determined maximum level of contaminants. Said hybrid device comprises at least one water quality sensor that indicates the need of drainage. In such a case, the hybrid device discards the contaminated water. Therefore, the hybrid device according to the present invention ensures a pre-decided quality of water for the user.

Said filter system of the hybrid device according to the present invention ensures a high quality of the water recycled.

The filter system according to the present invention may comprise only one unit or two or more individual units. This is further discussed below. According to one specific embodiment, the present invention comprises a filter system with a nano-filter such as for instance an electropositive nano-ceramic filter, e.g. a nano alumina (fiber) filter and at least one filter quality sensor. According to one specific embodiment, the nano-filter is a nano alumina (aluminum oxide) filter. The use of a nano-filter, such as a nano alumina filter, also implies the use of greater flow rates and the clogging resistance is also greater than equivalent performing membrane filters. Water purification based on nanotechnology implies purification on a viral level. In one specific embodiment of the present invention the hybrid device comprises a nano alumina filter comprising aluminum hydroxide fibers. The fibers may e.g. be about 2 nanometer in diameter. They are highly electropositive. When dispersed in water they may retain electronegative particles. The nano-filter incorporated in the hybrid device according to the present invention filters bacteria and nano size particulates, such as viruses. According to the present invention, the nano-filter enables filtering of e.g. intestinal bacteria, such as *E. coli*, and intestinal/abdominal parasites, which is of importance in relation to purification of water and of course showering. Also other contaminants are of course filtered off by the nano-filter incorporated in the device according to the present invention. The filtering according to the present invention is also preferred in terms of removal of contaminants when being compared to other methods like the use of an UV filter or pasteurization where the contaminants are neutralized but not removed. These methods may give a harmless water, but the taste and smell may still be undesirable.

In relation to the above, it should be said that the filter according to the present invention may be a depth filter/mechanical filter having a different size than nano, such as e.g. micro-size. Moreover, the removal of contaminants according to the present invention is also dependent on the combination of different units used in the hybrid device. As mentioned above, the hybrid device according to the present invention also comprises a water treatment unit. This unit may be a light unit, such as a UV lamp, or may be a heater, or may in fact be the combination of a UV unit and a heater. The water treatment unit is intended to perform a hygenisation of the water flow.

As the water treatment unit is part of the hybrid device, then the requirement of the filter unit is decreased. The filter unit may then act as a unit separating off larger particles or the like. As such, the depth filter does not have to have nanometer requirements in a set-up also involving a water treatment unit for hygenisation purposes according to the present invention.

Furthermore, combining the filter unit with at least one filter quality sensor in a filter system ensures that said filter system is running as expected and in an optimal manner.

Moreover, shower users have grown accustomed to showers with a high flow rate and combining said filter system in the present invention ensures said flow rate providing an equally comfortable shower experience as in a conventional shower. Moreover, other advantages according to the present invention are the high level of comfort and the high level of autonomy of the system, not being affected by other water usage in e.g. a household, for instance in relation to temperature fluctuations. The comfort according to the invention may for instance be based on different criteria, such as water flow and water pressure, the water quality, and the temperature as well as fluctuations thereof. Furthermore, the device system according to the present invention may also ensure a stabilized pressure/flow in e.g. a shower.

Furthermore, the present invention provides an option of a conventional shower experience, thereby being a hybrid device. This is one advantage with the present invention, if for example there is a malfunction, the user can still enjoy a shower. This provides the user with an economically, user- and environmentally friendly option to existing shower alternatives.

FURTHER SPECIFIC EMBODIMENTS OF THE INVENTION

Figure 1:
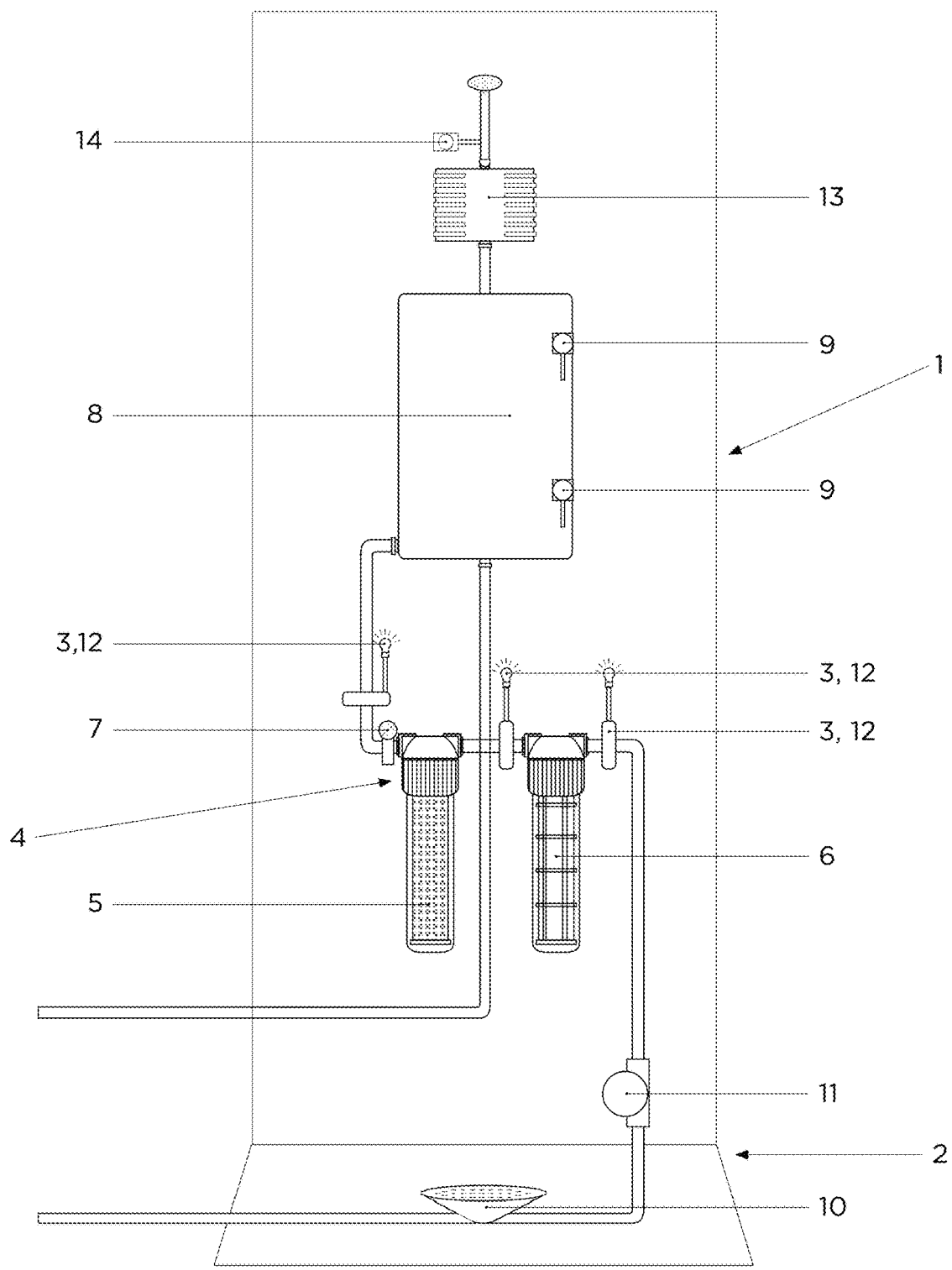
FIG. 1 shows one embodiment of the hybrid device according to the present invention.

Below, further specific embodiments of the present invention are described. The present invention is a hybrid device since it provides the user both with a recirculation shower and with an ordinary shower. The wording ordinary shower indicates a system with incoming new water and allowing the same water to exit directly after use into the drainage system. Furthermore, this hybrid device is automatically set to recirculation with drainage, when one of the indicators/sensors notifies the need to do so, but as a hybrid device is equipped with an option to set the system manually in ordinary shower mode. Another advantage with the recirculation mode according to the present invention is the high ensured level of clean water, even when being compared to regular shower water used today. For instance, contaminants like increased metal amounts, contaminants from fouling, depositions, bacteria like *Legionella* bacteria, etc. are common in warm water piping used in many water systems for households. Such contaminants may be removed by the system according to the present invention, and also neutralized by use of the water treatment unit according to the present invention. This may in fact also open up for the possibility of showering with an open mouth in countries where this is not suitable today. In this context it should be said that the hybrid device according to the present invention comprises a water treatment unit. According to one specific embodiment, the water treatment unit comprises a treating source in the form of a light unit and the functionality sensor for the water treatment unit is a light sensor. According to yet another specific embodiment, the light unit is a UV lamp and the functionality sensor is a UV sensor. Furthermore, according to yet another embodiment, the functionality sensor is at least one of a turbidity sensor, IR sensor or FTIR sensor, or a combination thereof.

As hinted, the modified drain according to the present invention may collect the water and with the aid of a circulation pump recycles water via the recirculation loop or discards water with high amounts of contaminants. The sensor system of the hybrid device according to the present invention facilitates with reference to if water should be recirculated or discarded. Based on that, according to one embodiment of the present invention, the sensors are arranged in a sensor system which gives input to a control system of the hybrid device with respect to a selection decision of either recycling of water in the hybrid device or separation of water from the hybrid device.

The selection decision may be performed by operating different means. According to one specific embodiment of the present invention, at least one level sensor is arranged in the modified drain, and wherein said at least one level sensor gives input to the control system with respect to a selection decision of either recycling of water in the system or separation of water from the system. To use also one sensor with a different main purpose as also a selection sensor, i.e. in this case as a water quality sensor, is further described below in relation to FIG. 3.

The water quality level may be set absolute, but can also be changed dynamically based on the water quality measurement and local water type and quality conditions. However, according to one specific embodiment, the maximum level of contaminants is a pre-determined maximum level.

According to one embodiment, the hybrid device according to the present invention comprises a recirculation loop, a filter system with a nano-filter and at least one filter quality sensor, and wherein the hybrid device is arranged to redirect the water from recirculation to drainage when the at least one filter quality sensor indicates the need thereof. Said filter quality sensor may be a pressure meter, a pressure switch or a flow meter but it can also comprise a combination of both. In one specific embodiment of the present invention, said filter quality sensor may be an advanced flow meter, and in another specific embodiment of the present invention, said filter quality sensor may be a digital pressure meter, but also other kinds of similar means are possible. When said at least one filter quality sensor is embodied as a pressure meter, a pressure drop indicates an initially full filter. Said filter is still performing purification at a pre-determined level, but this is an early indication that a replacement of said filter needs to take place. Further, when said at least one filter quality sensor is embodied as a flow meter, a decreased flow indicates, as mentioned above, that a replacement of said filter needs to take place. In one embodiment of the present invention, said at least one filter quality sensor is positioned before the pre-filter, in process terms. In process terms implies that the water passes said filter quality sensor before it passes the pre-filter. In another embodiment said at least one filter quality sensor is positioned after the pre-filter and before the nano-filter, in process terms. In yet another embodiment of the present invention, said at least one filter quality sensor, is positioned after the nano-filter in process terms. One advantage, of an indication from at last one filter quality sensor, is reassurance that the system is operating as desired. Another advantage, of said at least one filter quality sensor, is a lengthened lifetime of said filter system.

In relation to the above mentioned filter quality sensor, if such is incorporated it is adapted to indicate if the filter system is operating as intended. It should, however, be said that the present invention also embodies a hybrid device without a filter quality sensor, and which only has a functionality sensor for the water treatment unit, e.g. a UV sensor for a UV lamp.

Said nano-filter in the present invention utilizes electron adsorption as means for purification, and the electropositive fibers adsorbs various sorts of particles, such as silica, metals, bacteria and virus, but also other sorts of particles. One advantage in the present invention, in comparison with SE469413 or US2011225722, is the ability to purify water at a viral level. US2011225722 implies a filtration of large particles, and SE469413 implies a filtration of large particles and bacteria. Neither US2011225722 nor SE469413 discloses prevention of spreading of virus.

Another embodiment of the present invention comprises more than one nano-filter coupled in series or parallel. Further, an attempt to replace existing filters in existing showers, with a nano-filter, would not be enough to achieve the present invention.

According to another embodiment, the hybrid device according to the present invention comprises at least one pre-filter, positioned before the nano-filter in, process terms. Standard filters may be used for this step, such as e.g. activated carbon filters, UV-filters, nylon filters or yarn-wound filters, but also other kinds of similar means are possible, such as e.g. ion exchange technique, comprising a back flush option to decrease the need for deliming.

It is important to understand that any type of filter technique may be possible to use in the pre-filter according to the present invention, and only examples are disclosed above. For instance, besides the ones disclosed above, also a wide-meshed filter, such as a mechanical filter, only filtering off very large particles may be used as the pre-filter. As said, many other types are also possible.

The use of different filters often implies different intended purposes. This may for example be to remove larger particles, such as hair and sand or smaller conta-minants, such as humus, chlorine or bacteria, but is not restricted to these examples exclusively. Different contaminants set different requirements on selected filter. One advantage, with at least one pre-filter, is a lengthened lifetime of the often more expensive nano-filter. Another advantage is the option to adjust the hybrid device to current water quality. Different soil type means different water quality, and thereby different requirements set on the hybrid device. The present invention, installed in regions with high levels of lime water and calcareous water, may require a wetting filter while a hybrid device installed at places where the water is soft, may not need said filter. Further, said hybrid device, installed in a private facility may only require a filter separating from sand and hair, and then a yarn wound filter may be sufficient. If for example the present invention is installed in a place where there is an issue with hummus, an active carbon filter may be the optimal choice.

As mentioned above, there are different filters that may be used in the present invention. In one embodiment of the present invention, a combination of different filters may be used. These filters may be housed in one or more filter housing(s). One advantage, with said filter housing(s), is an option of containing different types of pre-filters and combining said pre-filters. This may, as hinted above, allow the present invention to be optimized, according to requirements set by the existing water type, at the intended location of where the hybrid device is to be installed.

In yet another embodiment of the present invention, said filter housing(s) can be modified. Said modified filter housing(s) may consist of a built in flow meter that is replaced along with said filter, when said filter quality sensor indicates the need thereof. One advantage is the option of continuous development and optimization of said filter type by the shower manufacturer. Another advantage is facilitating filter exchange. Neither SE469413 nor US2011225722 discloses anything that may facilitate maintenance. Filter housings of today imply that a skilled person need to perform the replacement of filters, but said filter housing(s) according to the present invention, with a built in flow meter, implies a design that allows facilitated filter replacement. One embodiment of said filter housing(s), with a built in flow meter, may allow a filter replacement through a two step button push.

In another embodiment of the present invention, said hybrid device comprises a water container. The water quality is further ensured by said water container only containing pure water. This is different in comparison to the solution disclosed in SE469413, where contaminated rinse water is kept in the container. Said water container according to the present invention, holding clean water, prevents issues with bacterial growth, spreading of virus and provides a low maintenance. Further, said water container comprises a level sensor that indicates a low level of water and a level sensor that indicates a high level of water, and wherein the hybrid device is arranged to allow new water to flow in to said water container, when the level sensor indicates the need thereof. This further ensures a steady flow within the system.

In one specific embodiment of the present invention, the water container may be about 10 L, but containers in the range of 8-30 L, dependent upon the intended use, may be of interest. Also smaller water containers, even below 2-3 L and even down to 0.5 L, and larger water containers may be possible according to the present invention. In for example a submarine, where a large group is to use the same shower, a larger container may be preferred and continuous showering applied.

In one embodiment of the present invention, said hybrid device comprises a flow through water heater. This is different from SE469413, which discloses a heat coil. A heat coil may be suitable for small volumes of water and low flow rates, but may pose a problem today, when a comfortable shower requires a flow rate of 9-20 l/min for approximately 6-8 minutes. The present invention utilizes, in one embodiment, a flow through heater in combination with a water container, which ensures required flow rate and a pleasant temperature. In one specific embodiment of the present invention, the flow through water heater has a power of about 6.5 kW and a water container volume of about 10 L.

It should be noted that the heating system of the present invention may embody different units and be of different type. For instance, a heating coil such as above is possible, but a heat exchanger or a system thereof, is another possible alternative. Other possible examples are heating with electric heater like a heating cartridge, and heat exchanging by the use of tap hot water. The latter alternative may be beneficial as there is no need for e.g. an extra power supply, however the water consumption and also the energy consumption may be high. Another possible example is heating with other types of media, such as e.g. liquefied petroleum gas (LPG). Moreover, the regulation of the heating system may vary, e.g. an ordinary thermostat or several such temperature regulator units may be incorporated.

In yet another specific embodiment of the present invention, a mixer tap in contact with the water inlet may be used. This indicates further cost efficiency if a household for example has both warm and cold fresh water piping. Further, said mixing tap may reduce the size of the hybrid device.

One advantage with the present invention is that it can be installed in different places. In one embodiment of the present invention, said hybrid device may be installed in a shower cabin. In another embodiment of the present invention, said hybrid device may be connected to the regular water pipes in a house, and built in to the wall and/or floor. In yet another embodiment of the present invention, said hybrid device may be partially built in to the wall and/or floor. One advantage of said hybrid device is the option of adjusting size to fit various places. In one embodiment of the present invention, it is installed in a submarine and in another embodiment it is installed at a sports ground. At public places expensive parts may be advised to keep unexposed. In relation to this advantage of the present invention it may be mentioned that the showers described in US2011225722 and SE469413 both are limited to cabin solutions. As such they are limited to more or less traditional household usage, and are not suitable for installation in e.g. a submarine. The present invention, however, is a hybrid device which may find use in very different environments. Different examples are e.g. the traditional household installation, in possible module systems or in submarines as disclosed above. There are also very different possible system or module types where the hybrid device according to the present invention may be incorporated. One example is in a combined system with a shower (hybrid device) and bath tub, where clean water may be reused in a very economical way. In such a system, special valves and nozzles may have to be installed in the system. Another possible different use is as a standalone solution, with or without a cabin, where the hybrid shower device is coupled to an external energy (heating) source and possibly also an external water container. The latter solution may be an effective embodiment of the present invention for use in e.g. developing countries.

As mentioned above, the present invention may comprise a flow meter. One advantage of said flow meter is ensuring a steady flow; this may indicate filter condition, and this in turn may indicate the purity of the water. Further, in one embodiment of the present invention the flow is 9-20 L/min; in another specific embodiment of the present invention, the flow is about 15 L/min. Another advantage with the present invention, is receiving information from the flow meter. This information provides an indication about the amount of semi-contaminated water required to finish said nano-filter.

In one specific embodiment of the present invention, said hybrid device comprises at least one water quality sensor. Said sensor may be positioned in contact with said filter system, but also other positions within the system may be of interest. Said water quality sensor may be a TOC sensor (Total Organic Carbon), a biosensor, a pH meter (measuring acidity or alkalinity) or an optical sensor, but also other kinds of similar means are possible. In one specific embodiment of the present invention the water quality sensor is a conductive sensor, such as an electrical conductive sensor. Furthermore, according to yet another specific embodiment of the present invention said at least one water quality sensor is one or more electrical conductive sensor(s) or one or more turbidity sensor(s), or a combination thereof. Also turbidity is one measure that may be used to indicate the water quality.

In one embodiment of the present invention, said hybrid device comprises a modified drain. Said modified drain collects the water used and facilitates the stream of water towards the recycling loop and filter system or towards drainage. In one specific embodiment of the present invention, said modified drain comprises at least one sensor, indicating the water quality, as mentioned above, and wherein the hybrid device is arranged to redirect the water from recirculation to drainage when the at least one water quality sensor indicates the need thereof. Said water quality sensor may be a TOC sensor (Total Organic Carbon), a biosensor, a pH meter (measuring acidity or alkalinity) or an optical sensor, but also other kinds of similar means are possible. In yet another embodiment of the present invention, said nano-filter comprises at least one sensor indicating the water quality. One advantage of said water quality sensor is ensuring the user of a pre-determined water quality. In one specific example, a user that has concerns or actual information of a poor water quality, may allow all water to pass through the hybrid device according to the present invention one round, before using the water. Furthermore, in one specific embodiment relating to the present statement, the design may be a filter system placed before the water container, in process terms. The present invention is described as a shower concept but the hybrid device is to be seen as possible unit to incorporate in various equipment such as a sink, a toilet, a bathtub, a dishwasher, a washing machine, but not exclusively. Also other methods of application are thinkable. One specific embodiment is incorporating the device according to present invention close to the water inlet in a house. In this case, as is the case for also many other applications, the interaction between the filter quality sensor and a water quality sensor is important. The filter sensor according to the present invention ensures a satisfactory operation of the filter system, and the water quality sensor acts as a protector of the filter system so that the filter system is not subjected to a too contaminated water mixture. One may say that the optional water quality sensor according to the present invention may act as part of the re-filtration, i.e. together with the piping system.

In the present invention, when any of said sensors is indicating an issue, the hybrid device notifies the user and the system is redirected from recirculation to drainage. Dependent on the embodiment, the system notifies where there is an issue in process terms. The system informs the user if it is for example the pre-filter, the nano-filter or the recirculation pump that needs to be examined.

According to the present invention, said hybrid device comprises a recirculation loop. Said recirculation loop facilitates recirculation of water within the system. In its simplest design, said recirculation loop may be said to constitute only piping/tubing. The design may vary and the ability to recirculate water is the key feature of the recirculation loop according to the present invention. According to one embodiment of the present invention, said recirculation loop comprises at least one recirculation pump. Said recirculation pump may be a two component pump, but other pumps are possible. In another embodiment, said recirculation loop comprises two recirculation pumps. One said recirculation pump, facilitates collecting water via said modified drain. The other said recirculation pump facilitates pressure management of water flow near said water reservoir.

Furthermore, it should be noted that the water reservoir according to the present invention may function as a buffer tank. Such a buffer tank may act as a pressure equalizer or damper for the hybrid device system so that pressure may be held reasonably constant in the entire system.

According to one embodiment of the present invention, then the water reservoir is connected to the recirculation loop. According to yet another embodiment, said hybrid device also comprises at least one level sensor within said water reservoir, e.g. two or more level sensors.

One advantage of the present invention is the option of bypassing the recirculation mode allowing all water to be drained. This provides the user with a conventional shower experience. This may be useful if the hybrid device is intended for several users, and a few of the users have little faith in technology, or the system is temporarily malfunctioning. Either way the user is not left without a shower option. Further, if the user is waiting for a service technician to repair, or exchange any part, the user is not left without a shower option. The present invention provides the user with an economically, user- and environmentally friendly option to existing shower alternatives.

The present invention is also directed to a method for operating a hybrid device according to the invention. Therefore, the present invention also relates to a method involving using a hybrid device allowing for purification and either recycling of water or discarding of water according to the present invention, where said method comprises:
  measuring the water quality by using said at least one water quality sensor;
  indicating the functionality of the water treatment unit by using the functionality sensor; and
  recirculating water in the recirculation loop if the water quality is at a desired level and redirecting the water from recirculation to drainage and discarding the water from the hybrid device when any of the sensors are indicating that the water is contaminated above the maximum level of contaminants.

According to one specific embodiment, then the water is redirected from recirculation to drainage and is discarded from the hybrid device when the functionality sensor indicates a low functionality of the water treatment unit. This embodiment implies that it is not only the water quality sensor that may enable this change of operation. As disclosed below, also another type of sensor, such as a level sensor may enable such change of operation, i.e. going from recirculation to separation of water and discarding of the same.

DETAILED DESCRIPTION

FIG. 1 shows one embodiment of the hybrid device 1 according to the present invention. According to this specific embodiment, the hybrid device 1 comprises a recirculation loop 2, at least one filter quality sensor 3, a filter system 4, nano-filter 5, pre-filter 6, flow meter 7, water reservoir 8, level sensor 9, modified drain 10, circulation pump 11, at least one water quality sensor 12, and a flow through water heater 13. A possible temperature gauge 14 is also shown.

Figure 2:
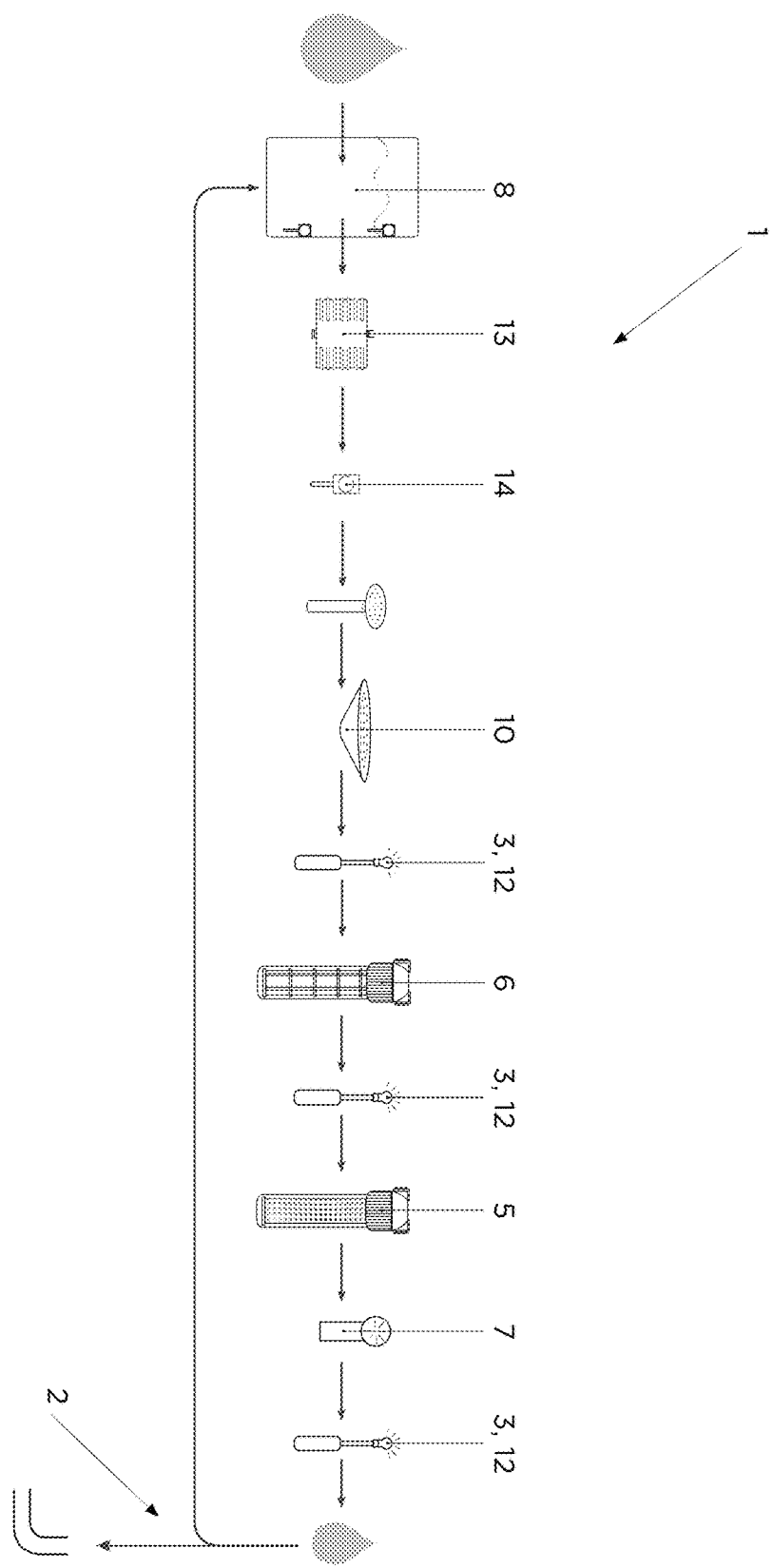
FIG. 2 shows one example of a flow chart for the shower concept of the present invention.

FIG. 2 shows one example of a flow chart of the present invention. According to this example, the flow chart comprises: a hybrid device 1, a recirculation loop 2, at least one filter quality sensor 3, nano-filter 5, pre-filter 6, flow meter 7, water reservoir 8, modified drain 10, at least one water quality sensor 12, flow through water heater 13. A possible temperature gauge 14 is also shown.

Figure 3:
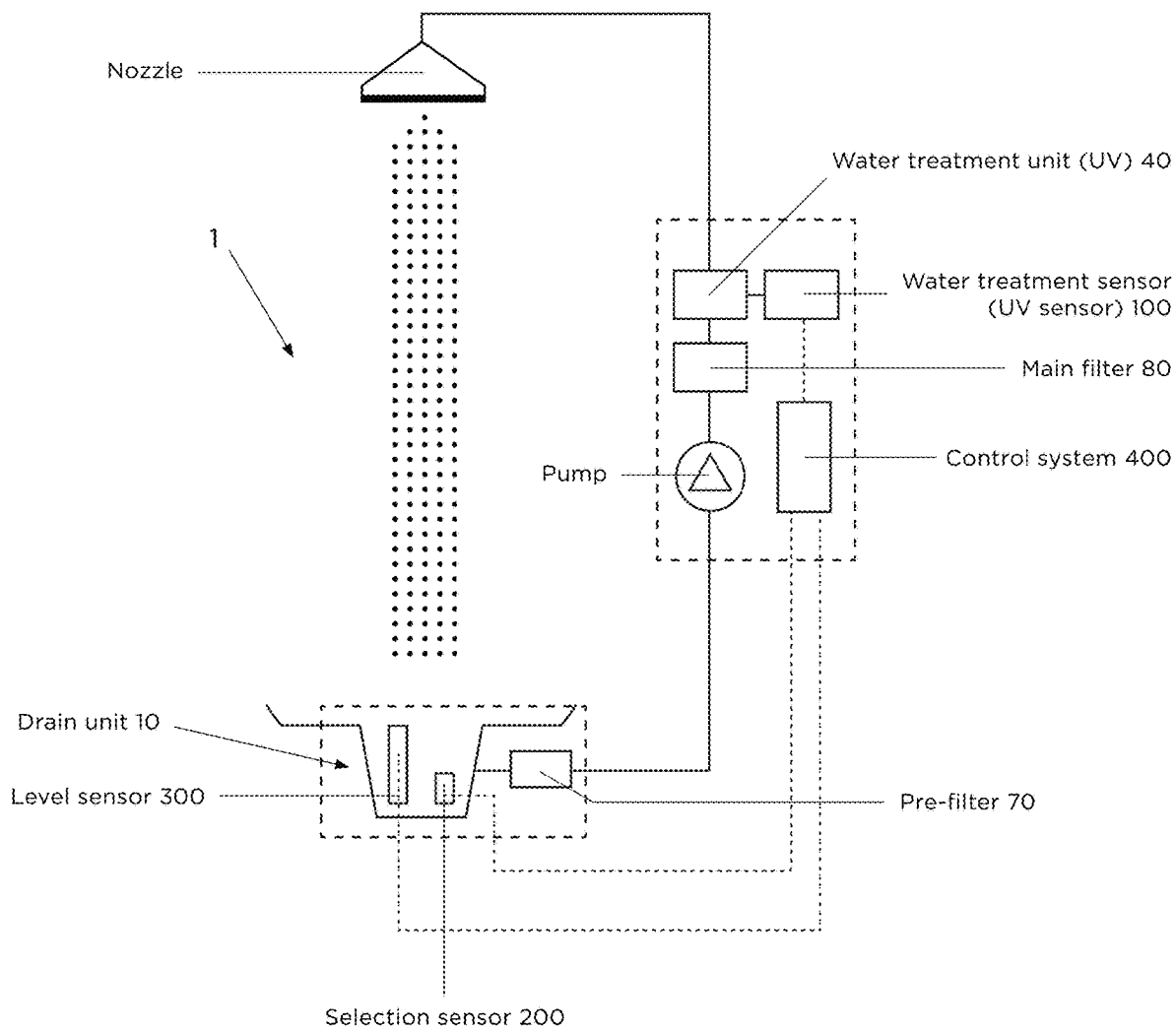
FIG. 3 shows yet another embodiment according to the present invention.

In FIG. 3 there is shown yet another embodiment of the present invention. In this case the hybrid device 1 comprises a water treatment unit 40, suitably a combined water heater and water treatment unit, which in this case comprises a UV source, e.g. a UV lamp, which is connected to a first sensor type 100 (in this case a UV sensor being the functionality sensor). Moreover, the hybrid device 1 also comprises a filter system comprising a main filter 80, in the form of a mechanical filter, being the mid/fine filter and a pre-filter 70 (removable mesh filter, i.e. a rough filter). Furthermore, a pump, control system 400, nozzle (and/or handheld shower) and of course piping is also arranged in the hybrid device 1. In the drain unit 10, there are provided a second sensor type 200 (main "selection sensor") and also a third sensor type 300 being a level sensor. Both of these sensors 200, 300 are also connected to the control system 400. If any of these sensors, i.e. the main selection sensor or functionality sensor, or in fact also the level sensor, indicate the need of directing the water flow from recirculation to discarding the water, then the control system ensures this change in the hybrid device 1, i.e. the hybrid device 1 selects to go into separation mode and not recirculation mode.

In line with the above, and as a continuation thereof, according to one specific embodiment of the present invention, then the hybrid device 1 comprises a sensor system where at least one sensor has multiple functionality. For instance, a level sensor in the form of an electrical conductivity sensor may also work as a water quality sensor, even if the main purpose is to measure the level.

Furthermore, according to one specific embodiment of the present invention, then the sensor system comprises at least three different types of sensors being one first that measures water quality, a second one measuring another parameter, such as level, but which also functions as a selection sensor, directly or indirectly, and a last sensor type being a functionality sensor for the water treatment unit. As mentioned above, for instance the level sensor may then have a double purpose so that both the level and as well water quality is measured in one and the same sensor.

It should be noted that the hybrid device according to the present invention of course may comprise different standard components, also having varied design, which are not explicitly mentioned. Examples of such are one or more shower nozzles, different kinds of tubing, valves, etc. etc. Moreover, the design of the hybrid device may vary, and the present invention, as formulated in claim 1, should be seen as embodying different forms of the device.

The invention claimed is:

1. A hybrid device allowing for purification and either recycling of water or discarding of water, comprising:
    a recirculation loop which facilitates recirculation of water within said hybrid device;
    a water reservoir connected to the recirculation loop and further connected to a fresh water line configured to provide fresh water to the reservoir;
    a filter system comprising at least one main filter;
    at least one water quality sensor configured to indicate a level of contaminants in the water;
    a shower nozzle;
    a water treatment unit disposed between the main filter and the shower nozzle and comprising a treating source in the form of a light unit configured to perform a hygienisation of water;
    a functionality sensor for the water treatment unit, wherein the functionality sensor for the water treatment unit is a light sensor configured to indicate the functionality of the water treatment unit;
    a flow through water heater configured to maintain a desired flow rate and water temperature; and
    a modified drain coupled to a control system and having at least one level sensor arranged in the modified drain, wherein the modified drain is adapted to collect used water, and wherein the modified drain and the control system are configured to, at least one of, facilitate a stream of the used water towards the recirculation loop and filter system for purification and recirculation, or discard the used water to a drainage system based on input received from (1) the at least one water quality sensor regarding an indication of the level of contaminants in the used water, (2) the at least one level sensor, and (3) the functionality sensor.

2. The hybrid device according to claim 1, wherein the main filter is a depth filter.

3. The hybrid device according to claim 1, wherein the filter system also comprises a pre-filter being a rough filter unit.

4. The hybrid device according to claim 3, wherein the rough filter unit is positioned in the modified drain.

5. The hybrid device according to claim 1, wherein the filter system also comprises a filter quality sensor being adapted to indicate if the filter system is operating as intended.

6. The hybrid device according to claim 1, said hybrid device also comprising two level sensors within said water reservoir.

7. The hybrid device according to claim 1, wherein the modified drain collects the water and with the aid of a circulation pump recycles water via the recirculation loop or discards water with high amounts of contaminants.

8. The hybrid device according to claim 1, wherein said at least one water quality sensor is one or more electrical conductive sensor(s) or one or more turbidity sensor(s), or a combination thereof.

9. The hybrid device according to claim 1, wherein the light unit is a UV lamp and the functionality sensor is a UV sensor.

10. The hybrid device according to claim 1, wherein the functionality sensor is at least one of a turbidity sensor, IR sensor or FTIR sensor, or a combination thereof.

11. The hybrid device according to claim 1, wherein the input received from the at least one water quality sensor regarding an indication of the level of contaminants is compared to a maximum level of contaminants, and wherein the maximum level of contaminants is a pre-determined maximum level.

12. A method involving using a hybrid device allowing for purification and either recycling of water or discarding of water according to claim 1, wherein said method comprises:
    measuring the water quality by using said at least one water quality sensor;
    indicating the functionality of the water treatment unit by using the functionality sensor; and
    recirculating water in the recirculation loop if the water quality is at a desired level and redirecting the water from recirculation to drainage and discarding the water from the hybrid device when any of the sensors are indicating that the water is contaminated above the maximum level of contaminants.

13. The method according to claim 12, wherein the water is redirected from recirculation to drainage and is discarded from the hybrid device when the functionality sensor indicates a low functionality of the water treatment unit.

14. A hybrid device, which is a shower that is adapted to function both as a recirculation shower and as an ordinary shower, and allows purification and either recycling of water or discarding of water, wherein said hybrid device comprises:

a recirculation loop which facilitates recirculation of water within said hybrid device;

a filter system comprising a nano-filter, at least one filter quality sensor, and at least one pre-filter positioned-before the nano-filter in process terms;

a water reservoir connected to the recirculation loop, wherein the water reservoir is further connected to a fresh water line configured to provide fresh water to the reservoir;

a water treatment unit disposed between the main filter and the shower nozzle and comprising a treating source in the form of a light unit configured to perform a hygienisation of water;

a functionality sensor for the water treatment unit, wherein the functionality sensor for the water treatment unit is a light sensor configured to indicate the functionality of the water treatment unit;

a flow through water heater connected to the recirculation loop configured to heat water from the water reservoir, wherein the flow through water heater is located on a recirculation loop water line between of the nano-filter and a showerhead that provides water to the shower; and a modified drain coupled to a control system and having a first of at least one water quality sensor arranged in the modified drain, the first water quality sensor configured to indicate the quality of water in the modified drain, wherein the modified drain and the control system are adapted to, at least one of, facilitate a stream of used water towards the recirculation loop and the filter system for purification and recirculation, or discard the used water to a drainage system based on input received from (1) the first water quality sensor, (2) the at least one filter quality sensor, and (3) the functionality sensor.

* * * * *